(12) United States Patent
Yoshida (10) Patent No.: US 12,474,544 B2
(45) Date of Patent: Nov. 18, 2025

(54) OPTICAL SCANNER AND IMAGE FORMING APPARATUS INCLUDING THE SAME

(71) Applicant: KYOCERA Document Solutions Inc., Osaka (JP)

(72) Inventor: Shingo Yoshida, Osaka (JP)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 419 days.

(21) Appl. No.: 18/156,532

(22) Filed: Jan. 19, 2023

(65) Prior Publication Data

US 2023/0236388 A1 Jul. 27, 2023

(30) Foreign Application Priority Data

Jan. 26, 2022 (JP) .................. 2022-010079

(51) Int. Cl.
| | |
|---|---|
| *G02B 7/182* | (2021.01) |
| *G02B 26/10* | (2006.01) |
| *G02B 26/12* | (2006.01) |
| *H04N 1/024* | (2006.01) |

(52) U.S. Cl.
CPC .......... *G02B 7/182* (2013.01); *G02B 26/105* (2013.01); *G02B 26/121* (2013.01); *H04N 1/02409* (2013.01)

(58) Field of Classification Search
CPC .... G02B 26/125; G02B 26/10; G02B 26/123; G02B 26/12; G02B 26/124
See application file for complete search history.

(56) References Cited

U.S. PATENT DOCUMENTS

| | | | | |
|---|---|---|---|---|
| 5,828,479 A | * | 10/1998 | Takano | H04N 1/1135 |
| | | | | 359/201.1 |
| 9,141,025 B1 | * | 9/2015 | Tomioka | G02B 26/121 |

FOREIGN PATENT DOCUMENTS

| | | | | |
|---|---|---|---|---|
| JP | 2006227497 A | * | 8/2006 | |
| JP | 2007292945 A | * | 11/2007 | |
| JP | 2008009000 A | * | 1/2008 | |
| JP | 2010066609 A | * | 3/2010 | |
| JP | 2010097196 A | * | 4/2010 | |
| JP | 2012-159529 | | 8/2012 | |
| JP | 2012159529 A | * | 8/2012 | |
| JP | 2016126287 A | * | 7/2016 | |
| JP | 2017045004 A | * | 3/2017 | |
| JP | 2017045005 A | * | 3/2017 | |

* cited by examiner

*Primary Examiner* — Christopher Stanford
(74) *Attorney, Agent, or Firm* — LEX IP MEISTER, PLLC (57) ABSTRACT

An optical scanner is provided with a light source, a deflector, an optical element, an imaging lens, a fixing structure, and a housing. The optical element has a reflecting surface. The fixing structure has a first support wall, a second support wall and a biasing member. The first support wall has a support projection with a tip part protruding along a thickness direction toward a rear surface and abutting on the rear surface, and an inclined surface extending from a tip part to a side opposite to the second support wall. A first angle between a first straight line extending in the perpendicular direction orthogonal to a bottom surface of the housing and a surface of the optical element is smaller than a second angle between the first straight line and the inclined surface. The second angle is less than 90 degrees.

9 Claims, 7 Drawing Sheets

OPTICAL SCANNER AND IMAGE FORMING APPARATUS INCLUDING THE SAME

INCORPORATION BY REFERENCE

This application is based upon and claims the benefit of priority from the corresponding Japanese Patent Application No. 2022-010079 filed on Jan. 26, 2022, the entire contents of which are incorporated herein by reference.

BACKGROUND

The present disclosure relates to an optical scanner and an image forming apparatus including the same.

Conventionally, electrophotographic image forming apparatus has an optical scanner that scans a surface of a photoreceptor drum (a scanned surface) with a light beam emitted from a light source to form an electrostatic latent image.

An optical scanner having a light source, a deflector, an optical element, multiple imaging lenses, a fixing structure and a housing is known. The deflector deflects the light beam emitted from the light source. The optical element is a mirror that can reflect the light beam emitted from the light source. On one side of the optical element in the thickness direction, a reflecting surface is formed to reflect the light beam deflected by the deflector. The imaging lens images a light beam onto a photoreceptor. The fixing structure fixes the optical element. The housing houses a light source, deflector, optical elements and a fixing structure. The light beam emitted from the light source is deflected by the deflector, reflected by the reflecting surface of the optical element, and imaged on the scanned surface of the photoreceptor drum.

The above described fixing structure includes a biasing member such as a leaf spring, a first support wall and a second support wall. The first support wall has a wall-shaped rib shape on the rear surface of the optical element (the surface opposite to the reflecting surface in the thickness direction), which faces in the thickness direction of the optical element. The first support wall has a support projection that projects toward the rear surface of the optical element. The second support wall is a wall-shaped rib shape that faces the end face of one side in the width direction of the optical element. The end face and the second support wall are abutted. The optical element is pressed against the first support wall by a biasing force of the biasing member. The tip part of the support projection abuts against the rear surface of the optical element. This contact between the tip part and the rear surface and the contact between the end face and the second support wall position the optical element in the thickness and width directions. This positioning defines the angle of reflection of the reflecting surface with respect to the light beam.

The optical element described above is inserted between the first support wall and the biasing member along the width direction and fixed to the housing. For this reason, when inserting the optical element, the side of the optical element may come into contact with the support projection protruding from the first support wall and become caught, and the optical element is likely not inserted to an appropriate position (the position in contact with the second support wall). In this case, the optical element needs to be pulled out once from between the first support wall and the biasing member and inserted again. Therefore, the above described optical scanner deteriorates in assemblability.

SUMMARY

The first configuration of the present disclosure is an optical scanner with a light source, a deflector, an optical element, an imaging lens, a fixing structure, and a housing. The deflector deflects a light beam emitted from the light source. The optical element has a reflecting surface formed on one side in a thickness direction to reflect the light beam deflected by the deflector. The imaging lens focuses the light beam onto a photoreceptor drum. The fixing structure has a first support wall that faces a rear surface of the optical element in the thickness direction, a second support wall that contacts one end face in the width direction of the optical element that is perpendicular to the thickness direction, and a biasing member that biases the optical element toward the first support wall, and the optical element is held between the biasing member and the first support wall to fix the optical element in the thickness direction and in the width direction. The housing houses the light source, the deflector, the optical element, the imaging lens, and the fixing structure. The first support wall has a support projection with a tip part protruding along the thickness direction toward the rear surface and abutting on the rear surface, and an inclined surface extending from the tip part to the side opposite to the second support wall. The first angle between a first straight line extending in a perpendicular direction orthogonal to a bottom surface of the housing and the surface of the optical element is smaller than the second angle between the first straight line and the inclined surface. The second angle is less than 90 degrees.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
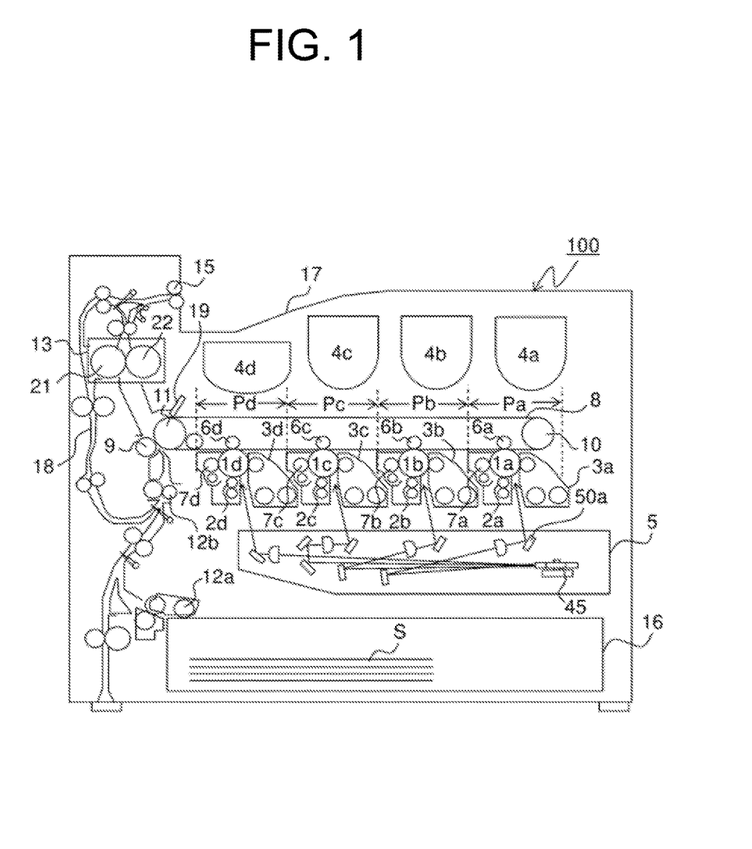
FIG. 1 shows a schematic cross sectional view showing the internal structure of an image forming apparatus 100 according to an embodiment of the present disclosure.

Embodiments of the present disclosure are described below with reference to the drawings. FIG. 1 is a schematic cross sectional diagram showing an internal structure of an image forming apparatus 100 according to an embodiment of the present disclosure. In the body of the image forming apparatus 100 (here, a color printer), four image forming parts Pa, Pb, Pc and Pd are arranged in order from an upstream side (right side in FIG. 1) in a conveyance direction. These image forming parts Pa to Pd are provided corresponding to images of four different colors (cyan, magenta, yellow and black) and sequentially form cyan, magenta, yellow and black images through processes of charging, exposure, development and transfer, respectively.

Photoreceptor drums 1a, 1b, 1c and 1d carrying visible images (toner images) of respective colors are arranged in these image forming parts Pa to Pd. In addition, an intermediate transfer belt 8 rotating in the clockwise direction in FIG. 1 is provided adjacent to each image forming part Pa to Pd. Toner images formed on these photoreceptor drums 1a to 1d are sequentially primary transferred and superimposed on the intermediate transfer belt 8 that moves while abutting on each photoreceptor drum 1a to 1d. Then, the toner image primary transferred onto the intermediate transfer belt 8 is secondarily transferred onto the sheet S (recording medium) as an example of a recording medium by a secondary transfer roller 9. Furthermore, the sheet S on which the toner image is secondarily transferred is ejected from a main body of the image forming apparatus 100 after the toner image is fixed in a fixing device 13. The image forming process for each photoreceptor drum 1a to 1d is executed while the photoreceptor drums 1a to 1d are rotated counterclockwise in FIG. 1 by a main motor (not shown).

The sheet S on which the toner image is secondarily transferred is housed in a sheet cassette 16 arranged at the lower part of the main body of the image forming apparatus 100, and is conveyed to the nip between the secondary transfer roller 9 and a drive roller 11 of the intermediate transfer belt 8 via a sheet feed roller 12a and a pair of resist rollers 12b. Dielectric resin sheets are used as the intermediate transfer belt 8, and seamless belts are mainly used as the intermediate transfer belt 8. On the downstream side of the secondary transfer roller 9, a blade-shaped belt cleaner 19 is arranged to remove toner and the like remaining on the surface of the intermediate transfer belt 8.

Next, the image forming parts Pa to Pd are described. Charging devices 2a, 2b, 2c and 2d for charging the photoreceptor drums 1a to 1d, an optical scanner 5 for exposing image information to each photoreceptor drum 1a to 1d, developing devices 3a, 3b, 3c and 3d for forming toner images on the photoreceptor drums 1a to 1d, and cleaning devices 7a, 7b, 7c and 7d for removing developer (toner) and the like remaining on the photoreceptor drums 1a to 1d are provided around and below the rotatably arranged photoreceptor drums 1a to 1d.

When image data is input from a higher-level device such as a personal computer, the surfaces of photoreceptor drums 1a to 1d are first uniformly charged by the charging devices 2a to 2d. Then, light beam is irradiated by the optical scanner 5 according to the image data, and an electrostatic latent image corresponding to the image data is formed on each photoreceptor drum 1a to 1d. The developing devices 3a to 3d are filled with a predetermined amount of a two-component developer containing toners of cyan, magenta, yellow and black, respectively. When the ratio of toner in the two-component developer filled in each developing device 3a to 3d falls below the specified value due to the formation of the toner image described later, toner is supplied from toner containers 4a, 4b, 4c and 4d to each developing device 3a to 3d. Toner in the developer is supplied onto photoreceptor drums 1a to 1d by developing devices 3a to 3d and is deposited electrostatically. Thus, a toner image corresponding to the electrostatic latent image formed by exposure from the optical scanner 5 is formed.

Then, an electric field is applied between the primary transfer rollers 6a to 6d and the photoreceptor drums 1a to 1d at a prescribed transfer voltage by the primary transfer rollers 6a to 6d, and the cyan, magenta, yellow and black toner images on the photoreceptor drums 1a to 1d are primary transferred onto the intermediate transfer belt 8. These four-color images are formed with predetermined positional relationships for predetermined full-color image formation. Then, in preparation for the subsequent formation of new electrostatic latent images, toner and the like remaining on the surface of photoreceptor drums 1a to 1d after the primary transfer are removed by cleaning devices 7a to 7d.

The intermediate transfer belt 8 is stretched over an upstream driven roller 10 and a downstream drive roller 11, and when the intermediate transfer belt 8 starts rotating in a clockwise direction with the rotation of the drive roller 11 by the belt drive motor (not shown), the sheet S is transported from the pair of resist rollers 12b to the nip between the drive roller 11 and the secondary transfer roller 9 provided adjacent to it at a predetermined timing, and the full-color image on the intermediate transfer belt 8 is secondarily transferred onto the sheet S. The sheet S on which the toner image is secondarily transferred is conveyed to the fixing device 13.

The sheet S conveyed to the fixing device 13 is heated and pressurized by a fixing belt 21 and a pressure roller 22 so that a toner image is fixed on the surface of the sheet S to form a predetermined full-color image. The sheet S on which the full-color image is formed is distributed in the conveyance direction by a branch part 30 branched in multiple directions, and is discharged as it is (or, after it is sent to the double-sided transport path 18 to form an image on both sides.) to a discharge tray 17 by a pair of discharge rollers 15.

Figure 2:
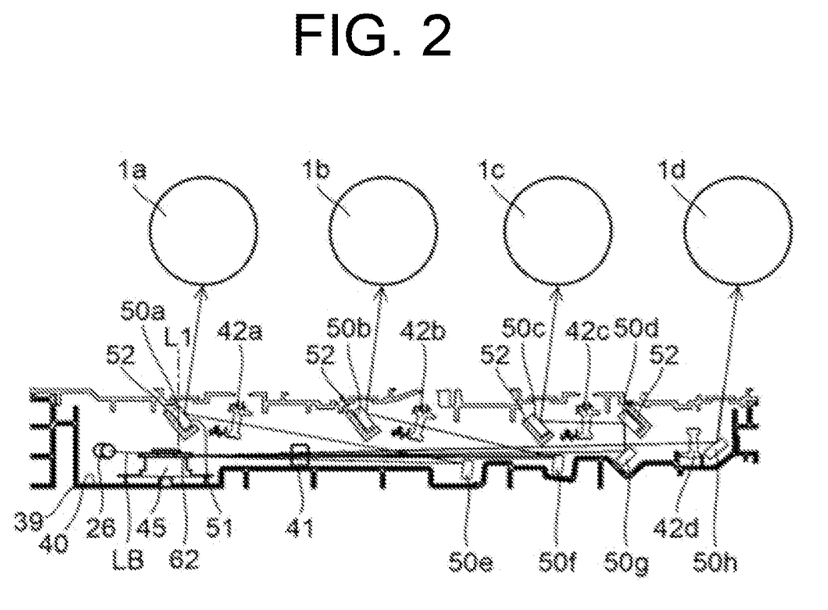
FIG. 2 shows a side sectional view schematically showing the configuration of the optical scanner 5.

Next, the optical scanner 5 according to the first embodiment of the present disclosure will be described in detail with reference to FIGS. 2 and 3. FIG. 2 is a side sectional view schematically showing the configuration of the optical scanner 5. As shown in FIG. 2, the optical scanner 5 is equipped with a housing 39, a light source unit 26 housed in the housing 39, a first imaging lens 41 (optical element), second imaging lenses 42a to 42d (optical element), a polygon mirror 45 (deflector), folding mirrors 50a to 50h (optical element), and a mirror fixing structure 52 (fixing structure). Although the optical scanner 5 performs optical scanning on each of the photoreceptor drums 1a to 1d, only the optical scanning on the photoreceptor drum 1a is described here, and the description of the photoreceptor drums 1b to 1d is omitted because the photoreceptor drums 1b to 1d are common to the photoreceptor drum 1a.

The light source unit 26 (light source) has a laser diode (not shown) and emits a light beam LB from the laser diode. The light beam LB emitted from the laser diode passes through a collimator lens and a cylindrical lens (both not shown) and is imaged on a deflecting surface 62 of the polygon mirror 45.

The polygon mirror 45 is a regular polygonal column (here, a regular hexagonal column) in which the deflecting surfaces 62 are formed on each side. Each deflecting surface 62 is a mirror surface, which can reflect and deflect the light beam LB emitted from the light source unit 26. The polygon mirror 45 is supported rotatably around a central axis (not shown) extending along the vertical direction (the direction of the paper in which FIG. 2 is drawn). The polygon mirror 45 is connected to a polygon motor (not shown) and rotates by the rotational driving force of the polygon motor.

The first imaging lens 41, the second imaging lenses 42a to 42d, and the folding mirrors 50a to 50h are arranged between the polygon mirror 45 and the photoreceptor drum 1a. The folding mirrors 50a to 50h have a mirror-finished reflecting surface 51 formed on one side of the mirror in the thickness direction. The light beam LB deflected by the polygon mirror 45 passes through the first imaging lens 41 and is reflected and deflected by the folding mirrors 50e to 50h. The light beam LB reflected and deflected by the folding mirror 50e passes through the second imaging lens 42a, is reflected and deflected by the folding mirror 50a, and is imaged on the outer peripheral surface of the photoreceptor drum 1a. The light beam LB opposite to the folding mirrors 50f, 50g similarly passes through the second imaging lenses 42b, 42c and is reflected by the folding mirrors 50b, 50c and is imaged on the outer peripheral surfaces of the photoreceptor drums 1b, 1c. The light beam LB reflected by the folding mirror 50h passes through the first imaging lens 41, passes through the second imaging lens 42d, is reflected and deflected by the folding mirror 50h, and is imaged on the photoreceptor drum 1d.

The folding mirrors 50a to 50h are fixed in the housing 39 by a plurality of mirror fixing structures 52 formed inside the housing 39. The folding mirrors 50a to 50h are fixed to the housing 39 with the reflecting surface 51 positioned at a predetermined first angle θ1 (the predetermined first angle θ1 being at a magnitude of the angle formed between the folding mirrors 50a to 50h and a the first straight line L1, which is perpendicular to the bottom surface 40 of the housing 39, and being on the counterclockwise side of the first straight line L1). In FIG. 2, the mirror fixing structure 52 supporting the folding mirrors 50e to 50h is omitted. Details of method in which the folding mirrors 50a to 50h are fixed by the mirror fixing structure 52 will be described later.

The polygon mirror 45 is rotated at constant speed clockwise by a polygon motor. By this rotation, the light beam LB is constantly scanned on the scanned surface of the photoreceptor drum 1a in the main scanning direction (i.e., the direction of the paper in which the drawing is drawn). Then, a scanning line extending linearly in the main scanning direction is formed on the scanned surface of the photoreceptor drum 1a (not shown). One scan line is drawn for each deflecting surface 62. The light beams LB are sequentially imaged on adjacent deflecting surfaces 62 by the rotation of the polygon mirror 45. At this time, the photoreceptor drum 1a is rotating, and multiple scanning lines are formed in the sub-scanning direction to form an electrostatic latent image.

Next, the structure of fixing the folding mirrors 50a to 50h to the housing 39 will be described in detail. FIG. 3 is a plan view of the folding mirror 50a fixed to the mirror fixing structure 52 as viewed from the reflecting surface 51 side. FIG. 4 is a cross sectional view showing a section of the folding mirror 50 along the A-A section line shown in FIG. 3. Hereafter, the direction parallel to the longitudinal direction (the lateral direction shown in FIG. 3) of the folding mirror 50a is referred to simply as the "longitudinal direction". In addition, the direction parallel to the thickness direction of the folding mirror 50a (the direction perpendicular to the paper surface in FIG. 3) is simply referred to as the "thickness direction". In addition, the direction parallel to the width direction (up and down direction shown in FIG. 3) of the folding mirror 50a perpendicular to the longitudinal and thickness directions is simply referred to as the "width direction". It should be noted that only the folding mirror 50a will be described here, and the other folding mirrors 50b to 50h and the mirror fixing structure 52 supporting them have common configurations to those of the folding mirror 50a, so the explanation will be omitted.

Figure 3:
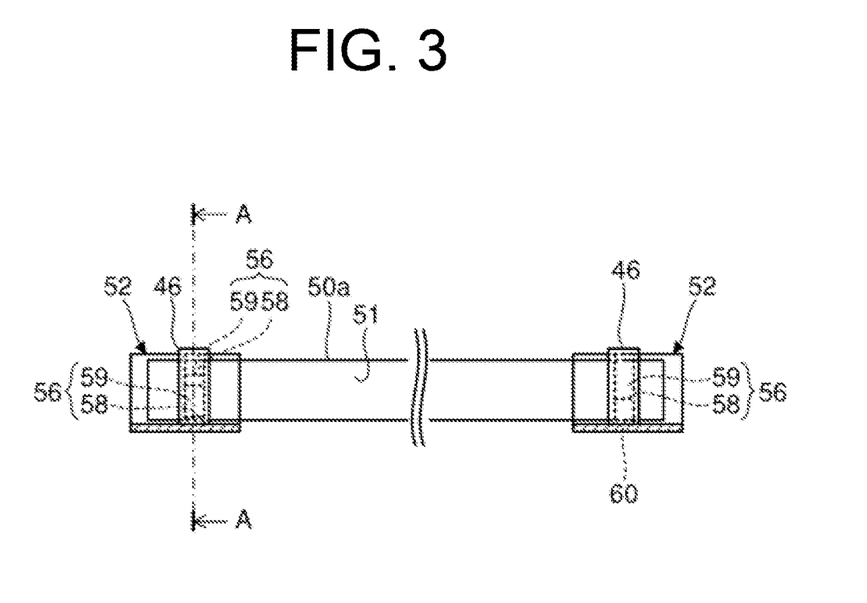
FIG. 3 shows a plan view of a folding mirror 50*a* fixed to a mirror fixing structure 52 as seen from a side of a reflecting surface 51.
Figure 4:
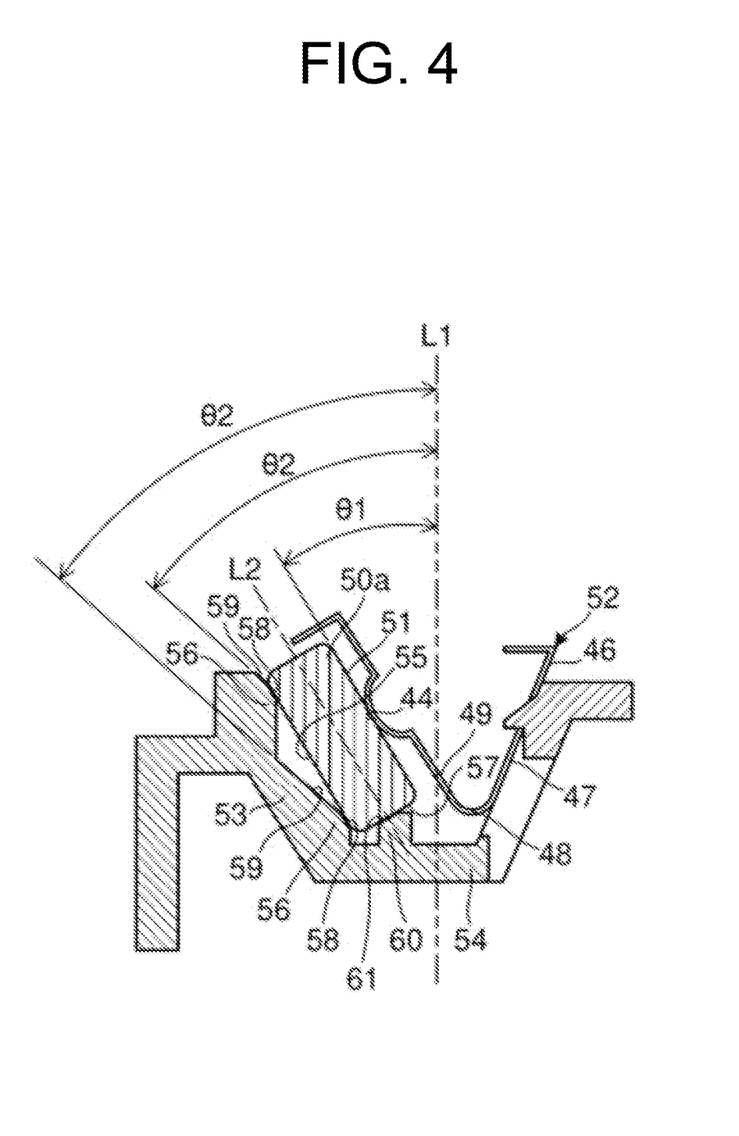
FIG. 4 shows a cross sectional view showing the section of the folding mirror 50*a* along at the A-A cross section line shown in FIG. 3.

As shown in FIG. 3, the mirror fixing structure 52 is provided at a position overlapping both ends of the folding mirror 50 a with respect to the longitudinal direction. As shown in FIG. 4, the mirror fixing structure 52 includes a first support wall 53, a second support wall 54, and a leaf spring 46 (a biasing member).

The first support wall 53 is adjacent to the folding mirror 50a in the thickness direction. The second support wall 54 is adjacent to the folding mirror 50a in the width direction. The second support wall 54 is connected to one end (lower end shown in FIG. 4) in the width direction of the first support wall 53.

The first support wall 53 has a support projection 56. The support projection 56 projects in the thickness direction toward a rear surface 55 of the folding mirror 50a (the surface opposite to the reflecting surface 51 of the folding mirror 50a in the thickness direction). A tip part 58 of the support projection 56 is formed in a plane parallel to the rear surface 55 (see FIG. 5). The tip part 58 is in surface contact with the rear surface 55.

An inclined surface 59 is formed in the support projection 56. The inclined surfaces 59 are connected to one of the both ends of the tip part 58 in the width direction, which is far side from the bottom surface 40 of the housing 39 (far side from the second support wall 54). The inclined surface 59 extends away from the rear surface 55. The inclined surface 59 is inclined with a predetermined second angle θ2 (magnitude of the angle formed with respect to the first straight line L1 and being located on the counterclockwise side of the first straight line L1).

Preferably, the first support wall 53 of the mirror fixing structure 52 located on one side in the longitudinal direction is provided with two support projections 56, and the first support wall 53 of the mirror fixing structure 52 located on the other side in the longitudinal direction is provided with one support projection 56 (see FIG. 3).

The second support wall 54 has a positioning projection 60 projecting upward. At the tip part of the positioning projection 60, a contact end face 61 is formed that is opposed in the width direction to a side surface 57 (one (lower) end face in the width direction) of the folding mirror 50a. The contact end face 61 abuts the side surface 57. The contact end face 61 is inclined at a given angle to the first straight line L1.

The leaf spring 46 is formed by bending a metal plate having spring properties into a predetermined shape (V-shaped in side view). The leaf spring 46 has a fixed part 47 fixed to the housing 39, a bent portion 48 connected to the fixed part 47, and an abutment part 49 connected to the bent portion 48. The fixed part 47 is fixed to the housing 39 by a so-called snap-fit structure. The bent portion 48 is curved upward in an arc shape from the lower end of the fixed part 47. The abutment part 49 is a rectangular plate-like body extending upward from the end of the bent portion 48 (the end opposite the fixed part 47). The abutment part 49 faces the reflecting surface 51 in the thickness direction. The abutment part 49 has a contact protrusion 44 protruding toward the reflecting surface. The contact protrusion 44 bulges toward the first support wall 53 in an arc shape.

The folding mirror 50a is inserted between the abutment part 49 of the leaf spring 46 and the first support wall 53. When the folding mirror 50a is inserted, the contact protrusion 44 abuts the reflecting surface 51 and elastically deforms from the bent portion 48 so that the abutment part 49 is away from the first support wall 53. The elastic force generated by this elastic deformation causes the contact protrusion 44 to press (bias) the folding mirror 50a toward the first support wall 53 along the thickness direction. The folding mirror 50a is pinched between the contact protrusion 44 and the support projection 56 by the pressing force of the leaf spring 46. The folding mirror 50a is clamped at both ends in the longitudinal direction between the leaf spring 46 and the first support wall 53, and is fixed to the housing 39 at the first angle θ1.

The second angle θ2 is greater than the first angle θ1 and less than 90 degrees (preferably 80 degrees or less (more preferably 70 degrees or less)). It is more preferable that the second angle θ2 is greater than the first angle θ1 by 10 degrees or more. Specifically, when the first angle θ1 is 30 degrees, the second angle θ2 is preferably 40 degrees or more and less than 90 degrees.

Figure 5:
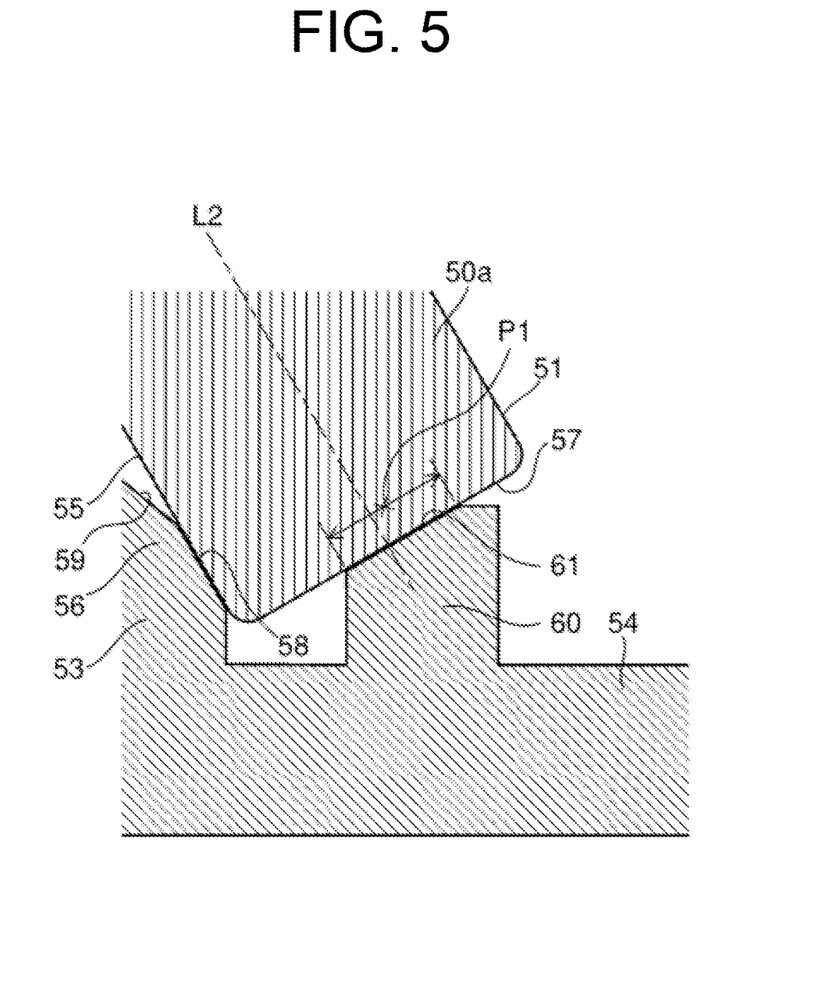
FIG. 5 shows an enlarged view of a periphery of a contact end face 61.

FIG. 5 is an enlarged view of the periphery of the contact end face 61. As shown in FIG. 5, the virtual second straight line L2 parallel to the width direction and passing through the center of the thickness direction of the folding mirror 50a is preferably located on the rear surface 55 side of the folding mirror 50a, with respect to the center P1 of the width direction of the contact end face 61.

In conventional optical scanners 5, the folding mirrors 50a to 50h generally do not have the inclined surface 59 as described above on the positioning projection 60, or the second angle θ2 is 90 degrees or more for manufacturing reasons. In such optical scanners 5, when the folding mirrors 50a to 50h are inserted between the first support wall 53 and the leaf spring 46, the tip parts of the folding mirrors 50a to 50h (around the corner between the side surface 57 and the rear surface 55) may come into contact with the support projection 56 protruding from the first support wall 53 and be caught. Then, it becomes difficult to insert the folding mirrors 50a to 50h further, and they cannot be placed at an appropriate position (where the side surface 57 and the contact end face 61 abut). In such a case, it is necessary to pull out the folding mirrors 50a to 50h once and insert them again between the first support wall 53 and the leaf spring 46 so as not to get caught in the support projection 56. Therefore, the assemblability of the conventional optical scanner 5 deteriorates.

In the optical scanner 5 of the above embodiment, as described above, the inclined surface 59 is formed so as to be connected to the tip part 58 of the support projection 56. Therefore, if the leading end of the folding mirrors 50a to 50h in the insertion direction (around the corner between the side surface 57 and the rear surface 55) contacts the support projection 56 when the folding mirrors 50a to 50h are inserted between the leaf spring 46 and the first support wall 53, the leading end of the folding mirrors 50a to 50h will contact the inclined surface 59. Here, as described above, the second angle θ2 of the inclined surface 59 is set to be larger than the first angle θ1 and less than 90 degrees. The inclined surface 59 is inclined at the above described second angle θ2. Therefore, when the folding mirrors 50a to 50h are to be inserted deeper from this state, the above tip parts of the folding mirrors 50a to 50h slide on the inclined surface 59 and pass over the tip part 58. Thus, it becomes possible to insert the folding mirrors 50a to 50h between the leaf spring 46 and the first support wall 53 until the side surface 57 is in contact with the contact end face 61. Therefore, it is unnecessary to pull out and reinsert the folding mirrors 50a to 50h, and deterioration in the assemblability of the optical scanner 5 can be suppressed. Thus, the optical scanner 5, which can suppress deterioration of assemblability by a simple configuration, and the image forming apparatus 100 equipped with the optical scanner 5 can be provided.

The mirror fixing structure 52 is provided at a position overlapping both ends of the folding mirrors 50a to 50h in the longitudinal direction. Thus, the folding mirrors 50a to 50h can be more firmly fixed to the housing 39.

As described above, it is preferable that the first support wall 53 of the mirror fixing structure 52 located on one side in the longitudinal direction is provided with two support projections 56, and the first support wall 53 of the mirror fixing structure 52 located on the other side in the longitudinal direction is provided with one support projection 56. In this way, when the folding mirrors 50a to 50h are pressed against the positioning projections 60 to position the folding mirrors 50a to 50h in the thickness direction, the folding mirrors 50a to 50h are positioned on the plane containing these 3 positioning projections 60. Therefore, the folding mirrors 50a to 50h can be stably positioned in the thickness direction.

Also, as described above, it is preferable that the second straight line L2 is located on the rear surface 55 of the folding mirrors 50a to 50h, with respect to the center P1 in the width direction of the contact end face 61. In this way, the contact position between the folding mirrors 50a to 50h and the second support wall 54 in the thickness direction is located relatively far from the rear surface 55. Therefore, when the folding mirrors 50a to 50h are pressed by the leaf spring 46, this pressing force can suppress the folding mirrors 50a to 50h from falling to the reflecting surface 51 side. Therefore, the leaf spring 46 can be more stably fixed to the housing 39.

In addition, by adopting the configuration in which the tip part 58 is formed in a planar shape as described above, the dimension of the tip part 58 and the position of the tip part 58 inside the housing 39 can be easily measured, the dimension management can be easily performed, and the assemblability can be improved. Also, when the folding mirrors 50a to 50h are inserted to the back, the tip part 58 and the rear surface 55 slide. At this time, since the contact area between the tip part 58 and the rear surface 55 is relatively large, the rear surface 55 is less likely to be scratched by contact with the tip part 58.

Figure 6:
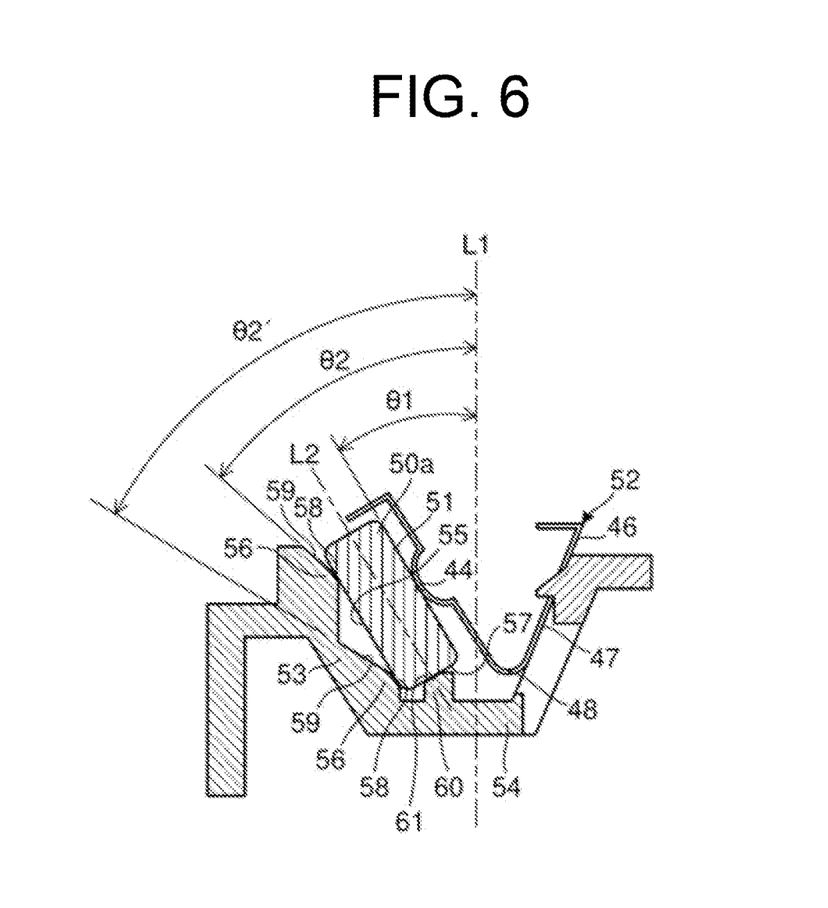
FIG. 6 shows a cross sectional view showing a variation of the optical scanner 5 according to an embodiment of the present disclosure.

The present disclosure is not limited to the above embodiment, and various modifications may be made without departing from the intent of this disclosure. For example, as shown in FIG. 6, the inclined surface 59 of the optical scanner 5 of the above embodiment can adopt a configuration in which the magnitude of the second inclination angle θ at the support projection 56 on one side in the width direction (which is near the second support wall 54) is different from the magnitude of the second inclination angle θ at the support projection 56 on the other side in the width direction (which is far from the second support wall 54). In this case, the second angle θ2' of the inclined surface 59 of the support projection 56 on the one side can be made larger than the second angle θ2 of the inclined surface 59 of the support projection 56 on the other side.

The support projection 56 located on one side of the pair of support projections 56 is located further back in the insertion direction than the support projection 56 on the other side, making it easier to get caught when inserting the folding mirrors 50a to 50h. For this reason, by making the second angle θ2' larger than the second angle θ2 as described above, it is possible to effectively prevent the folding mirrors 50a to 50h from being caught in the support projection 56 on one side when the folding mirrors 50a to 50h are inserted.

In addition, the folding mirrors 50a to 50h of the above embodiment need only be optical elements in which a reflecting surface capable of reflecting the light beam LB is formed. As such an optical element, for example, a prism can be adopted. The first imaging lens 41 and the second imaging lens 42a to 42d can also be fixed in the same configuration as the mirror fixing structure 52.

The leaf spring 46 may be an elastic member such as a coil spring, for example, as long as it has a biasing force that biases the folding mirrors 50a to 50h to the first support wall 53.

Figure 7:
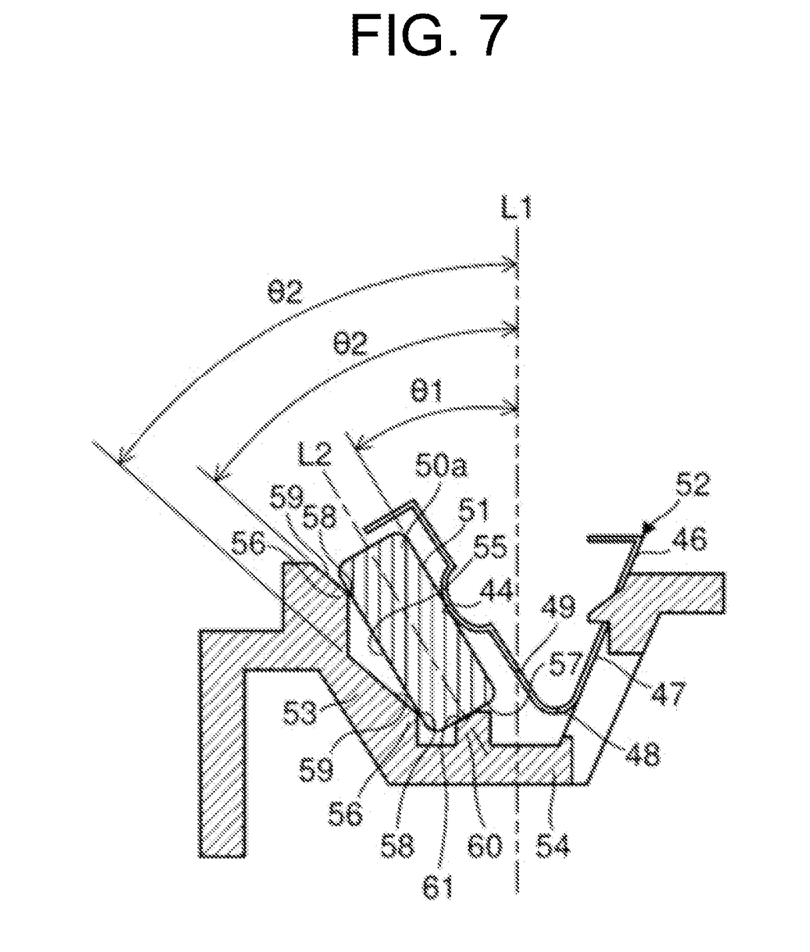
FIG. 7 shows a cross sectional view showing a further modification of the optical scanner 5 according to the present disclosure.

It is also assumed that the tip part 58 is formed in a planar shape, but a configuration in which the tip part is formed in a square shape can be adopted as shown in FIG. 7. In this case, the tip part 58 makes line contact with the rear surface 55. This makes it possible to place the folding mirrors 50a to 50h with the first angle θ1 set more precisely.

The present disclosure is applicable to the optical scanner in which the folding mirror is placed in the housing, and the light beam is deflected at several places to form the image on the scanned surface of the photoreceptor drum. The present disclosure can also be used in other mirrors for deflecting light beams, such as mirrors for detecting scanning start timing. The present disclosure can provide the optical scanner in which the folding mirror can be fixed to the housing by a simple structure and the image forming apparatus provided with the same.

What is claimed is:

1. An optical scanner comprising:
   a light source;
   a deflector deflecting a light beam emitted from the light source;
   an optical element that includes: a folding mirror reflecting the light beam deflected by the deflector; and an imaging lens imaging the light beam on a photoreceptor drum, and that is arranged in an optical path of the light beam;
   a fixing structure having: a first support wall facing a surface of the optical element in a thickness direction thereof; a second support wall contacting one end face in a width direction of the optical element perpendicular to the thickness direction; and a biasing member biasing the optical element toward the first support wall, and holding the optical element between the biasing member and the first support wall to fix the optical element in the thickness direction and in the width direction; and
   a housing that houses the light source, the deflector, the optical element and the fixing structure, wherein
   the first support wall has a support projection having: a tip part protruding toward the surface along the thickness direction and abutting on the surface; and an inclined surface extending from the tip part to an opposite side of the second support wall,
   a first angle between a first straight line extending in a direction perpendicular to a bottom surface of the housing and another surface of the optical element, opposite to the surface in the thickness direction, is smaller than a second angle between the first straight line and the inclined surface,
   the second angle is smaller than 90 degrees, and
   the tip part is formed as a plane parallel to the surface.

2. The optical scanner according to claim 1, wherein the second angle is greater than the first angle by 10 degrees or more.

3. The optical scanner according to claim 1, wherein the first support wall has a pair of support projections, including the support projection, aligned in the width direction, and the second angle of the inclined surface connected to the support projection on the one side in the width direction of the pair of support projections is larger than the second angle of the inclined surface connected to the support projection on the other side in the width direction of the pair of support projections.

4. The optical scanner according to claim 1, wherein the second support wall has a positioning surface abutting on the end face of the one side of the optical element, and a second straight line parallel to the width direction passing through a center of the optical element in the thickness direction is located on a side of the surface of the optical element with respect to a center of the positioning surface in the thickness direction.

5. The optical scanner according to claim 1, wherein the second angle is 70 degrees or less.

6. The optical scanner according to claim 1, wherein the fixing structure is arranged in pairs on both end sides in a longitudinal direction of the optical element, the fixing structure arranged on one end side in the longitudinal direction has a pair of support projections, including the support projection, and the fixing structure arranged on the other end side in the longitudinal direction has one of the support projections.

7. The optical scanner according to claim 1, wherein the optical element is a folding mirror.

8. An image forming apparatus comprising: the optical scanner according to claim 1.

9. An optical scanner comprising:
   a light source;
   a deflector deflecting a light beam emitted from the light source;
   an optical element that includes: a folding mirror reflecting the light beam deflected by the deflector; and an imaging lens imaging the light beam on a photoreceptor drum, and that is arranged in an optical path of the light beam;
   a fixing structure having: a first support wall facing a rear surface of the optical element in a thickness direction; a second support wall contacting one end face in a width direction of the optical element perpendicular to the thickness direction; and a biasing member biasing the optical element toward the first support wall, and holding the optical element between the biasing member and the first support wall to fix the optical element in the thickness direction and in the width direction; and
   a housing that houses the light source, the deflector, the optical element and the fixing structure, wherein
   the first support wall has a support projection having: a tip part protruding toward the rear surface along the thickness direction and abutting on the rear surface; and an inclined surface extending from the tip part to an opposite side of the second support wall,
   a first angle between a first straight line extending in a perpendicular direction orthogonal to a bottom surface of the housing and a surface of the optical element is smaller than a second angle between the first straight line and the inclined surface, and
   the second angle is smaller than 90 degrees, and
   the tip part is formed as a plane parallel to the rear surface.

* * * * *